United States Patent
Windler et al.

(10) Patent No.: US 9,721,588 B2
(45) Date of Patent: Aug. 1, 2017

(54) MAGNETIC RECORDING SYSTEM INCLUDING DIFFERENTIATED WRITE CURRENT EMPHASIS SIGNAL GENERATOR CIRCUIT

(71) Applicant: Avago Technologies General IP (Singapore) Pte. Ltd., Singapore (SG)

(72) Inventors: Peter J. Windler, Fort collins, CO (US); Bruce A. Wilson, San Jose, CA (US); Ross S. Wilson, Menlo Park, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/981,842

(22) Filed: Dec. 28, 2015

(65) Prior Publication Data
US 2017/0186449 A1    Jun. 29, 2017

(51) Int. Cl.
G11B 5/09 (2006.01)
G11B 5/012 (2006.01)
G11B 20/10 (2006.01)
G11B 5/00 (2006.01)

(52) U.S. Cl.
CPC .............. *G11B 5/09* (2013.01); *G11B 5/012* (2013.01); *G11B 20/10009* (2013.01); *G11B 2005/0013* (2013.01); *G11B 2005/0016* (2013.01)

(58) Field of Classification Search
None
See application file for complete search history.

(56) References Cited

U.S. PATENT DOCUMENTS

| | | | | |
|---|---|---|---|---|
| 4,597,021 A | * | 6/1986 | Yamamitsu | H04N 5/21 348/E5.077 |
| 4,845,573 A | * | 7/1989 | Hardeng | G11B 20/10194 360/46 |
| 5,223,990 A | * | 6/1993 | Yoshida | G11B 27/005 360/39 |
| 5,838,509 A | * | 11/1998 | Yun | H03K 5/082 360/46 |
| 8,315,128 B1 | | 11/2012 | Wilson et al. | |
| 8,390,314 B2 | | 3/2013 | Dang et al. | |
| 8,792,197 B1 | | 7/2014 | Wilson et al. | |
| 8,854,936 B1 | | 10/2014 | Maul et al. | |

(Continued)

OTHER PUBLICATIONS

U.S. Appl. No. 14/977,595, filed Dec. 21, 2015 Bruce A. Wilson, Unpublished.

*Primary Examiner* — Tan X Dinh
(74) *Attorney, Agent, or Firm* — Sheridan Ross P.C.

(57) ABSTRACT

A storage system includes a magnetic storage medium, a magnetic write head, a channel circuit and a preamplifier. The channel circuit includes a write data input, a differentiated edge emphasis signal generator, a write data output and a differentiated edge emphasis signal output. The preamplifier includes a write data input configured to receive write data from the channel circuit write data output, an edge emphasis signal input configured to receive a differentiated edge emphasis signal from the channel circuit differentiated edge emphasis signal output, and a write current edge emphasis controller configured to generate a write current to the magnetic write head based at least in part on the write data and on the differentiated edge emphasis signal.

20 Claims, 6 Drawing Sheets

(56) References Cited

U.S. PATENT DOCUMENTS

| | | | |
|---|---|---|---|
| 8,929,013 B1 | 1/2015 | Mastrocola | |
| 9,030,770 B2 | 5/2015 | Contreras et al. | |
| 2005/0207053 A1* | 9/2005 | Barnett | G11B 5/09 360/68 |
| 2012/0026619 A1* | 2/2012 | Wilson | G11B 27/36 360/31 |
| 2012/0243390 A1 | 9/2012 | Lennard et al. | |
| 2013/0128375 A1* | 5/2013 | Livshitz | G11B 5/02 360/48 |
| 2014/0064404 A1 | 3/2014 | Gonzalez | |
| 2015/0213813 A1* | 7/2015 | Lammers | G11B 20/10018 360/46 |

* cited by examiner

MAGNETIC RECORDING SYSTEM INCLUDING DIFFERENTIATED WRITE CURRENT EMPHASIS SIGNAL GENERATOR CIRCUIT

FIELD OF THE INVENTION

Various embodiments of the present invention provide systems and methods for differentiated signaling of write current emphasis information in a magnetic recording system.

BACKGROUND

Various magnetic recording systems such as hard disk drives utilize a write head to record data on a magnetic medium. Data to be recorded is provided to the write head coil as an alternating electrical current. The electrical current passes through a metallic coil wrapping around the write head, generating a magnetic field. The magnetization state of a pole tip in the write head is switched by the magnetic field. As the magnetized pole tip is passed over the magnetic storage medium, for example a spinning ferromagnetic platter, the magnetization of regions of the magnetic medium below the pole tip are altered and can later be read back to retrieve the data. With the write head mounted on a movable arm over the magnetic medium, signals are passed in some parts of the system on a flexible circuit with limited space.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components.

DETAILED DESCRIPTION OF THE INVENTION

Figure 1:
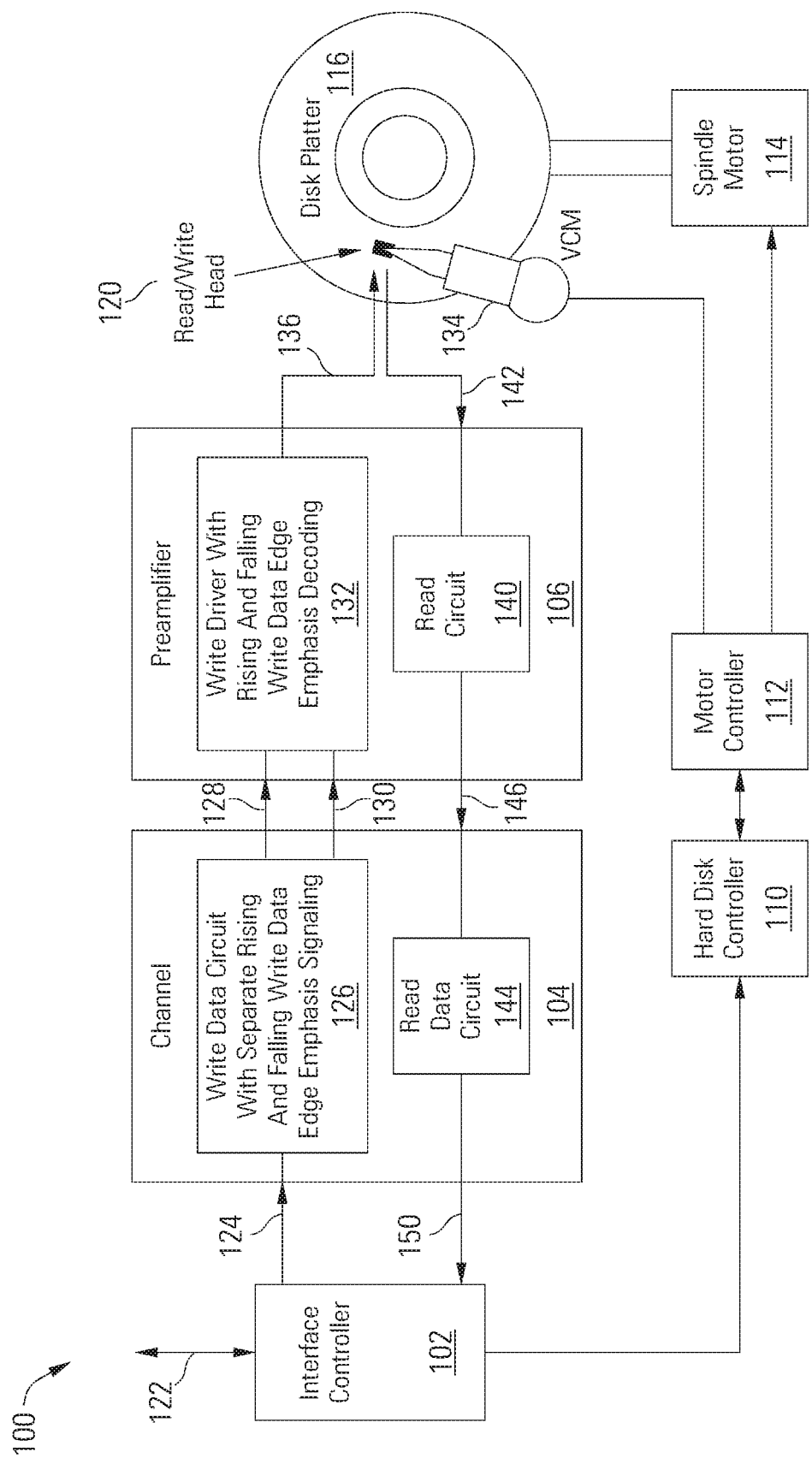
FIG. 1 depicts a magnetic storage system including a channel and preamplifier with differentiated write current emphasis signaling in accordance with some embodiments of the present invention.

Various embodiments of the present invention provide systems and methods for differentiated signaling of write current emphasis information in a magnetic recording system. Write current emphasis information is generated in a channel for rising edges of write data and for falling edges of the write data. The term "differentiated" is used herein to refer to this distinction between rising and falling edges of write data when generating write current emphasis information to be transmitted from the channel to a preamplifier. The emphasis information for rising and falling edges can be transmitted from the channel to the preamplifier using individual rising edge and falling edge signals, or in a combined signal such as, but not limited to, a three-level pulse-amplitude modulated (PAM-3) signal. Although the rising edge and falling edge signals can be combined in a PAM-3 or other signal for transmission, the combined signal is still considered a differentiated signal as the term is used herein, because it contains separate emphasis information for rising write data edges and for falling write data edges. The write current emphasis information is transmitted from the channel to the preamplifier using differential signals in some embodiments, although it can be transmitted in any suitable manner.

The preamplifier receives the write current emphasis information along with write data from the channel, generating a write current corresponding to the write data to drive a pole tip in a write head to record the write data on a magnetic storage medium. The preamplifier emphasizes selected transitions in the write current based on the write current emphasis information from the channel in order to improve recording of the write data on the magnetic storage medium. The write current emphasis information can be generated in the channel based at least in part on the data pattern being written, such as, in some embodiments, based on the magnet lengths or the number of successive same-valued bits. Pattern dependent write (PDW) thus provides control of one or more aspects of the write current used to record bits on a magnetic storage medium, for example controlling current overshoot amplitude and/or duration, thereby improving recording quality, hence areal density and bit-error-rate. The write current used to record a bit is controlled at each transition of the write data as a function of the data pattern around that transition.

During recording of closely-spaced magnetic transitions of minimum run-length (1T, where T is the fundamental bit interval), the magnetic state of the head's pole-tip may have insufficient time to become magnetically saturated. An aggressive write current overshoot setting can then be used to drive the pole tip quickly from one saturated state to the opposite saturated state. A less aggressive setting is used for longer run-lengths. The short run length case favors use of an aggressive overshoot setting or other write current characteristics for faster magnetic switching. Thus, it is beneficial to provide means of dynamically varying writer parameters as a function of run-length of present and adjacent bit cells. The same arguments and benefits also pertain to some extent to 2T-length magnets, or to particularly troublesome other transition lengths.

Write head switching is a particularly complicated process that affects overall recording performance in magnetic recording systems. Switching of a pole tip in the write head is initiated by the magnetic field from a coil wrapped around the pole tip. Rapid switching of the pole tip magnetization is a bottleneck for a fast write process. The write current passing through the coil and the magnetization state of the pole tip (and, hence, the magnetic field affecting switching of the bits on the disk platter) are related non-linearly due to the characteristics of the magnetic medium and the intrinsic time scale of the magnetization process. Magnetic response is significantly delayed in time from the write current and has a saturation wave shape which is different from the write current. Thus, the particular characteristics of the write current are adapted to the characteristics and requirements of the magnetic recording system, including the magnetic characteristics of the pole tip and the magnetic data storage medium or disk platter, the rate at which the data is written, the areal density for data storage on the magnetic medium, etc. Such characteristics can be controlled in the magnetic recording system disclosed herein to improve recording quality.

Rather than explicitly signaling the boost level or other write current characteristics to the preamplifier, the channel transmits indications of which rising edges and which falling edges in the write data to emphasize in the write current as the write data is recorded. Signaling from the channel to the preamplifier is made more difficult by the very high data rates involved and by the fact that the write data timing can be deliberately perturbed as much as one half of a full rate symbol in some cases in order to precompensate for distortions in the write process. This precompensation can reduce the ideal timing margin to one quarter of a full rate symbol when transmitting un-differentiated binary emphasis data from the channel to the preamplifier.

By transmitting differentiated write current emphasis information in which the rising edge boost information and falling edge boost information signals each contain 2T wide pulses, the ideal timing margin is 1 T, where T is the fundamental bit interval.

Turning to FIG. 1, a magnetic storage system 100 or hard disk drive with differentiated write current emphasis signaling is depicted in accordance with some embodiments of the invention. Storage system 100 includes an interface controller 102, channel 104, preamplifier 106, a hard disk controller 110, a motor controller 112, a spindle motor 114, a disk platter 116, and a read/write head assembly 120. Interface controller 102 controls addressing and timing of data to/from disk platter 116. The interface controller 102 may include devices such as a processor, buffer memory, format control, error correction circuits, and interface circuits. The data on disk platter 116 consists of magnetic signals that may be written and detected by read/write head assembly 120 when the assembly is properly positioned over disk platter 116. In one embodiment, disk platter 116 includes magnetic signals recorded in accordance with either a longitudinal or a perpendicular recording scheme.

In a typical write operation, interface controller 102 receives digital data 122 to be stored on the disk platter 116 and provides corresponding digital write data 124 to a write data circuit 126 in the channel 104. The digital data 122 may be received in serial form on a standardized device interface such as a Serial Advanced Technology Attachment (SATA) interface. During write operations, the digital data 122 is stored in a local buffer memory, formatted and augmented with error correction codes.

Write data circuit 126 may process the digital write data 124 in a number of ways, such as serializing the data at the desired bit rate, modulation coding the data and adding parity bits, and performing write pre-compensation. The write data circuit 126 provides write data 128 to a write driver 132 in preamplifier 106. The write data circuit 126 also detects patterns in the write data and generates differentiated write current emphasis signals 130 that are provided to the write driver 132 in the preamplifier 106, identifying transitions in write data 128 to be emphasized in the write current. In some embodiments, the differentiated write current emphasis signals 130 comprise a pair of differential binary signals. In some other embodiments, the differentiated write current emphasis signals 130 comprise a PAM-3 ternary signal combining the rising edge emphasis information and the falling edge emphasis information.

In some embodiments, the preamplifier 106 is mounted on an actuator arm 134, and the write data 128 and the differentiated write current emphasis signal(s) 130 are driven from the channel 104 by a transmitter and delivered over a flexcircuit in differential format or any other suitable format to the write driver 132 in the arm-mounted preamplifier 106. The preamplifier 106 converts the write data 130 to an analog signal, performs waveshaping, adds overshoot pulses or controls other write current parameters to aid the recording process based on the differentiated write current emphasis signals 130, and impresses in the write head portion of read/write head assembly 120 a bipolar programmable write current 136.

In a typical read operation, read/write head assembly 120 is accurately positioned by motor controller 112 over a desired data track on disk platter 116. Motor controller 112 both positions read/write head assembly 120 in relation to disk platter 116 and drives spindle motor 114 by moving read/write head assembly 120 to the proper data track on disk platter 116 under the direction of hard disk controller 110. Spindle motor 114 spins disk platter 116 at a determined spin rate (RPMs). A read circuit 140 in the preamplifier 106 establishes a bias current in the magneto-resistive sensor(s) on read/write head assembly 120. Once read/write head assembly 120 is positioned adjacent the proper data track, magnetic signals representing data on disk platter 116 are sensed by read/write head assembly 120 as disk platter 116 is rotated by spindle motor 114. The sensed magnetic signals are provided as a continuous, minute analog signal(s) 142 representative of the magnetic data on disk platter 116. The minute analog signal(s) 142 are transferred from read/write head assembly 120 to read circuit 140 in the preamplifier 106, where they are amplified and are conveyed to a read data circuit 144 in the channel 104 as analog read data 146. In turn, the read data circuit 144 in channel 104 decodes and digitizes the received analog signal to recreate the user data originally written to disk platter 116.

As part of processing the analog read data 146, the read data circuit 144 may perform one or more operations such as analog filtering, variable gain amplification, analog to digital conversion, equalization, timing recovery, data detection, decoding, deserialization, and servo demodulation to obtain the user data and servo information. The user data is provided by the read data circuit 144 as digital read data 150 to the interface controller 102, where it can be further error-corrected, stripped of special formatting fields, and reassembled in a buffer memory for transmission to a user device as digital data 122.

Figure 2:
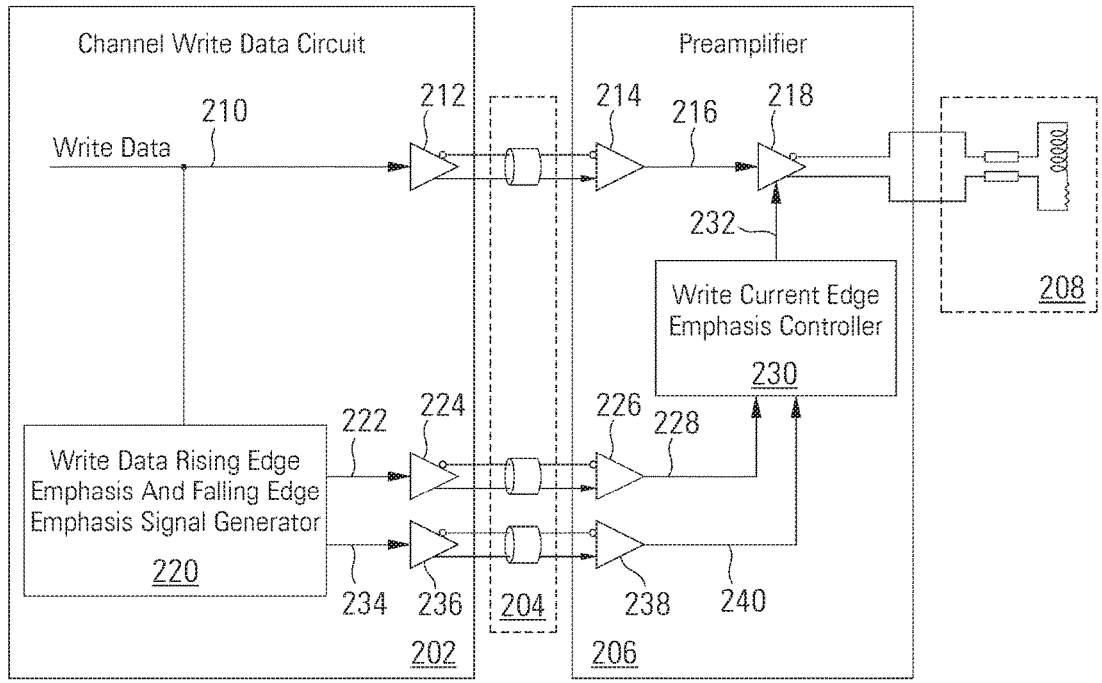
FIG. 2 depicts a channel write data circuit and preamplifier with differentiated write current emphasis signaling in accordance with some embodiments of the present invention.

Turning to FIG. 2, a channel write data circuit 202 and preamplifier 206 with differentiated write current emphasis signaling is depicted in accordance with some embodiments of the present invention. The write data circuit 202 processes write data 210 for storage, for example by serializing the data, applying pre-compensation, or in any other desired manner. The write data circuit 202 includes a write data rising edge emphasis and falling edge emphasis signal generator 220 which identifies patterns in the write data 210 and which selects rising edges and falling edges in the write data 210 to be emphasized in the write current through write head 208, yielding differentiated rising edge emphasis and falling edge emphasis signals 222, 234 that identify the rising and falling edges to be boosted or otherwise emphasized. The write data rising edge emphasis and falling edge emphasis signal generator 220 can use any suitable circuit for detecting patterns in the write data 210, such as, but not limited to, chains of flip flops with logic gates combining the outputs of the flip flops, state machines, etc. Based on the disclosure herein, one of ordinary skill in the art will recognize a variety of circuits and techniques that can be used to detect patterns in the write data 210 and to generate differentiated rising edge emphasis and falling edge emphasis signals 222, 234 in accordance with various embodiments of the present invention.

In some embodiments, the write data 210 and differentiated rising edge emphasis and falling edge emphasis signals 222, 234 are transmitted as differential signals over a flexible circuit 204 for noise immunity. Differential transmitters 212, 224, 236 are thus included in the write data circuit 202. Rising and falling transitions in the differential signals are defined, respectively, as negative-to-positive and positive-to-negative excursions of the differential signals. Differential receivers 214, 226, 238 are included in the preamplifier 206 in these embodiments, yielding write data 216 and differentiated rising edge emphasis and falling edge emphasis signals 228, 240 in the preamplifier 206. The preamplifier 206 is operable to process the write data 216 for recording on a magnetic storage medium using the write head 208 during write operations, as well as to amplify analog readback signals from the write head 208 during read operations.

A write driver 218 in the preamplifier 206 generates and drives a bipolar programmable write current through the write head 208 based upon the write data 216. A write current edge emphasis controller 230 in the preamplifier 206 receives the differentiated rising edge emphasis and falling edge emphasis signals 228, 240 and programs or controls the write driver 218 at each transition of the write data 216 to emphasize selected edges in the write data 216 identified by the differentiated rising edge emphasis and falling edge emphasis signals 228, 240.

The write current edge emphasis controller 230 latches or samples the values of the differentiated rising edge emphasis and falling edge emphasis signals 228, 240 based on a sampling clock that in some embodiments is substantially synchronous with the write data 216, sampling at write data edges.

The write current edge emphasis controller 230 and write driver 218 can control any type of write current characteristic, such as, but not limited to, write current overshoot amplitude at transitions. Based on the disclosure herein, one of ordinary skill in the art will recognize a variety of circuits that can be used in the write current edge emphasis controller 230 in the preamplifier 206 in accordance with various embodiments of the present invention, such as, but not limited to, sampling latches to sample the differentiated rising edge emphasis and falling edge emphasis signals 228, 240, emphasis current sources, and combining circuits to add emphasis currents to the write current at edges identified by the differentiated rising edge emphasis and falling edge emphasis signals 228, 240.

Figure 3:
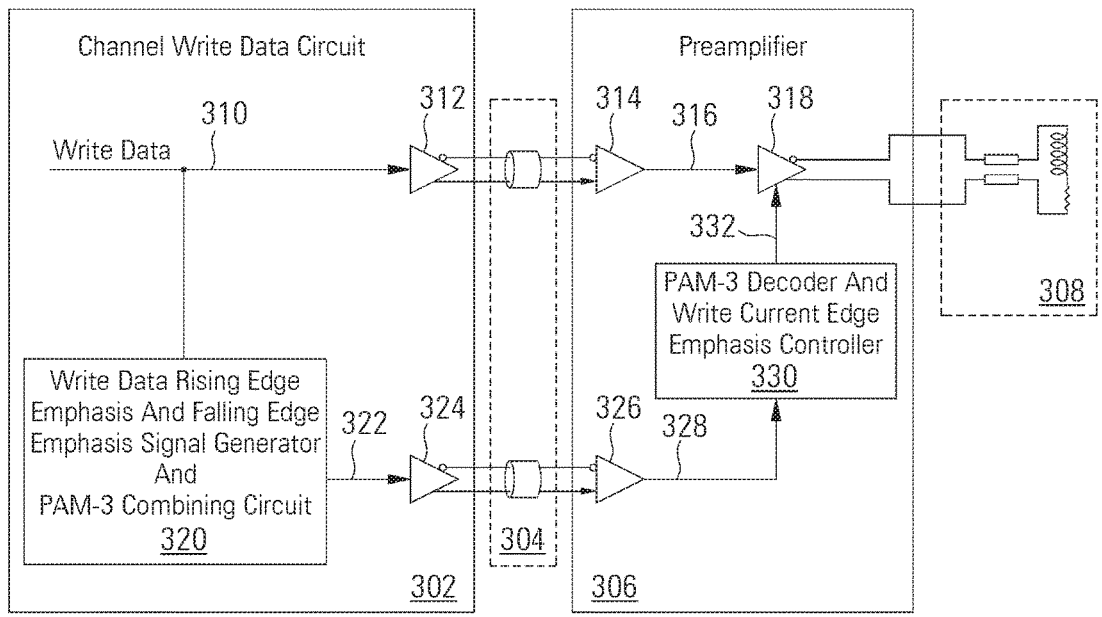
FIG. 3 depicts a channel write data circuit and preamplifier with differentiated write current emphasis signaling using a combined ternary signal in accordance with some embodiments of the present invention.

Turning to FIG. 3, in some embodiments a channel write data circuit 302 combines the write current emphasis signals for rising edges and falling edges to yield a combined differentiated rising edge emphasis and falling edge emphasis signal 322, such as, but not limited to, a PAM-3 ternary signal. The combined rising edge emphasis and falling edge emphasis signal 322 remains a differentiated signal as the term is used herein, because emphasis information for rising and falling edges of the write data 310 are still identified separately in the combined rising edge emphasis and falling edge emphasis signal 322.

The write data circuit 302 processes write data 310 for storage, for example by serializing the data, applying pre-compensation, or in any other desired manner. The write data circuit 302 includes a write data rising edge emphasis and falling edge emphasis signal generator 320 which identifies patterns in the write data 310 and which selects rising edges and falling edges in the write data 310 to be emphasized in the write current through write head 308, yielding combined rising edge emphasis and falling edge emphasis signal 322 that identifies the rising and falling edges to be boosted or otherwise emphasized. The rising edge emphasis and falling edge emphasis signal generator 320 can use any suitable circuit for detecting patterns in the write data 310 and for generating the combined rising edge emphasis and falling edge emphasis signal 322, such as, but not limited to, chains of flip flops with logic gates combining the outputs of the flip flops, state machines, etc.

In some embodiments, the write data 310 and combined differentiated rising edge emphasis and falling edge emphasis signal 322 are transmitted as differential signals over a flexible circuit 304 for noise immunity. Differential transmitters 312, 324 are thus included in the write data circuit 302. Differential receivers 314, 326 are included in the preamplifier 306 in these embodiments, yielding write data 316 and combined differentiated rising edge emphasis and falling edge emphasis signal 328 in the preamplifier 306. The preamplifier 306 is operable to process the write data 316 for recording on a magnetic storage medium using the write head 308 during write operations, as well as to amplify analog readback signals from the write head 308 during read operations.

A write driver 318 in the preamplifier 306 generates and drives a bipolar programmable write current through the write head 308 based upon the write data 316. A PAM-3 decoder and write current edge emphasis controller 330 in the preamplifier 306 decodes the combined differentiated rising edge emphasis and falling edge emphasis signal 328 to separate the emphasis information for rising and falling edges, and programs or controls the write driver 318 at each transition of the write data 316 to emphasize selected edges in the write data 316.

The PAM-3 decoder and write current edge emphasis controller 330 latches or samples the value of the combined differentiated rising edge emphasis and falling edge emphasis signal 328 based on a sampling clock that in some embodiments is substantially synchronous with the write data 316, sampling at write data edges.

The PAM-3 decoder and write current edge emphasis controller 330 and write driver 318 can control any type of write current characteristic, such as, but not limited to, write current overshoot amplitude at transitions. Based on the disclosure herein, one of ordinary skill in the art will recognize a variety of circuits that can be used in the PAM-3 decoder and write current edge emphasis controller 330 in the preamplifier 306 in accordance with various embodiments of the present invention, such as, but not limited to, sampling latches to sample the combined differentiated rising edge emphasis and falling edge emphasis signal 328, emphasis current sources, and combining circuits to add emphasis currents to the write current at edges identified by the combined differentiated rising edge emphasis and falling edge emphasis signal 328.

The magnetic recording system with differentiated write current emphasis signaling disclosed herein can select write data edges to emphasize according to any suitable criterion. For example, in a first example operating mode, the first edge of any 1T bit is emphasized. In a second example operating mode, the first edge of any 1T bit that follows another bit that is longer than 1T is emphasized. However, the magnetic recording system with differentiated write current emphasis signaling is not limited to these example operating modes. In some embodiments, a magnetic recording system with differentiated write current emphasis signaling can be adapted for use with multiple modes of emphasized edge selection, so that the edge selection mode can be programmed or selected, for example by programming an edge selection mode value in a register in the channel.

Figure 4:
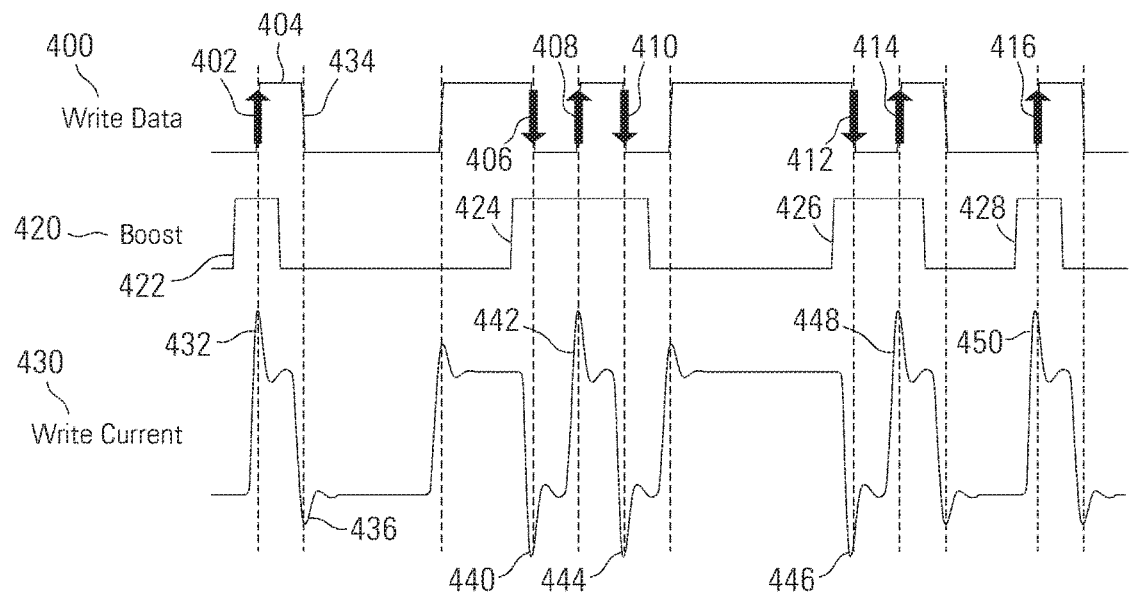
FIG. 4 depicts a timing diagram illustrating write current boost in a first operating mode emphasizing the first edge of any 1T bit in accordance with some embodiments of the present invention.

Turning to FIG. 4, a timing diagram depicts write current boost in the first operating mode which selects the first edge of any 1T bit to be emphasized in accordance with some embodiments of the present invention. An example stream of write data 400 is depicted with rising edge 402 at the start of 1T bit 404. Other edges are depicted at the start of other 1T bits, including falling edges 406, 410, 412 and rising edges 408, 414. A boost waveform 420 is depicted with pulses 422, 424, 426, 428 corresponding with write data edges 402, 406, 408, 410, 412, 414 to be emphasized in this operating mode. However, the boost waveform 420 is not a differentiated write current emphasis signal, which has a wider timing margin than the boost waveform 420 of FIG. 4, but is merely a visual representation in FIG. 4 to show the first edges of each 1T bit to be emphasized in the write current. An example write current waveform 430 corresponding to write data 400 illustrates one possible type of edge emphasis. Notably, the write current transition corresponding to write data edge 402 has an emphasized overshoot 432 added because edge 402 begins a 1T bit. In contrast, the write current transition corresponding to falling edge 434 of write data 400 has a normal amount of overshoot 436. Similarly, the write current transitions corresponding to write data edges 406, 408, 410, 412, 414, 416 each have an emphasized overshoot 440, 442, 444, 446, 448, 450, respectively, as they each begin 1T bits. The first edge of each 1T bit in write data 400 is shown with a bold arrow as a visual indication of which edges in FIG. 4 are to be emphasized in the write current.

Figure 5:
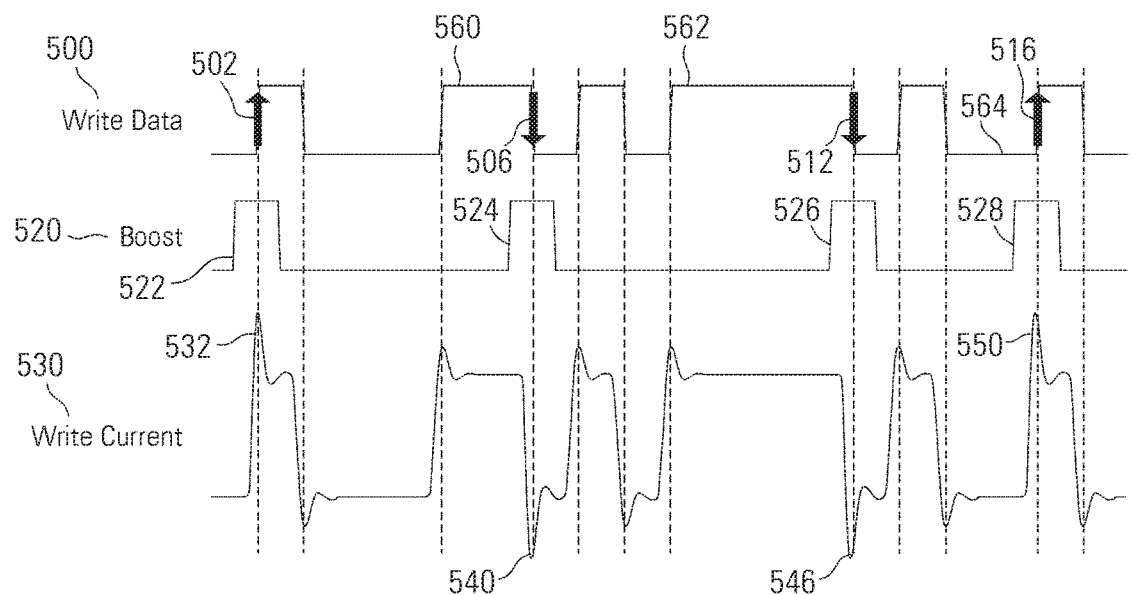
FIG. 5 depicts a timing diagram illustrating write current boost in a second operating mode emphasizing the first edge of any 1T bit following >1T bits in accordance with some embodiments of the present invention.

Turning to FIG. 5, a timing diagram depicts write current boost in the first operating mode which selects the first edge of any 1T bit following a bit that is longer than 1T to be emphasized in accordance with some embodiments of the present invention. An example stream of write data 500 is depicted in which edges 502, 506, 512, 516 begin 1T bits following longer bits (e.g., 2T bit 560, 4T bit 562, and 2T bit 564. A boost waveform 520 is depicted with pulses 522, 524, 526, 528 corresponding with write data edges 502, 506, 512, 516 to be emphasized in this operating mode. Again, the boost waveform 520 is not a differentiated write current emphasis signal, which has a wider timing margin than the boost waveform 520, but is merely a visual representation in FIG. 5 to show the first edges of each 1T bit following a >1T bit and therefore emphasized in the write current. An example write current waveform 530 corresponding to write data 500 illustrates one possible type of edge emphasis. Notably, the write current transitions corresponding to write data edges 502, 506, 512, 516 have emphasized overshoots 532, 540, 546, 550 added because edges 502, 506, 512, 516 begin 1T bits following >1T bits. The first edges 502, 506, 512, 516 of each 1T bit in write data 500 following >1T bits are shown with bold arrows as visual indications of which edges in FIG. 5 are to be emphasized in the write current.

Figure 6:
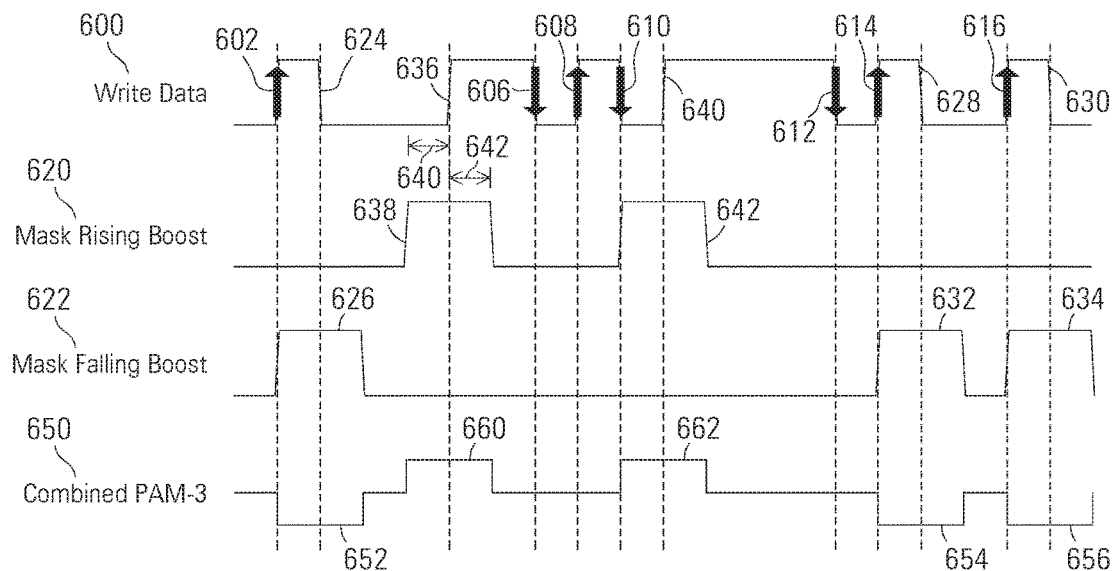
FIG. 6 depicts a timing diagram for the first operating mode illustrating differentiated individual mask rising boost and mask falling boost signals from a channel to a preamplifier in accordance with some embodiments of the present invention, and a corresponding combined PAM-3 mask rising boost and mask falling boost signal from a channel to a preamplifier in accordance with some other embodiments of the present invention.

Turning to FIG. 6, a timing diagram for the first operating mode depicts differentiated individual mask rising boost and mask falling boost signals generated in a channel circuit to be transmitted to a preamplifier in accordance with some embodiments of the present invention. In some other embodiments, the channel combines the individual mask rising boost and mask falling boost signals in a combined PAM-3 signal to be transmitted to the preamplifier. An example stream of write data 600 is depicted in which rising edges 602, 608, 614, 616 and falling edges 606, 610, 612 all begin 1T bits and are to be emphasized in the write current in this operating mode. In the embodiment of FIG. 6, the channel identifies all transitions in the write data 600 that are not to be emphasized by masking those edges with mask rising boost signal 620 and mask falling boost signal 622. For example, falling edge 624 of write data 600 does not begin a 1T bit and should therefore not be emphasized in this case, and mask falling boost signal 622 is asserted in pulse 626 to signal to the preamplifier not to emphasize edge 624. Similarly, falling edges 628, 630 of write data 600 do not begin 1T bits and should therefore not be emphasized, with assertions 632, 634 of mask falling boost signal 622 signaling this to the preamplifier. Again, rising and falling edges are differentiated or treated separately. Rising edge 636 of write data 600 does not begin a 1T bit and should therefore not be emphasized, and mask rising boost signal 620 is asserted in pulse 638 to signal this to the preamplifier. Rising edge 640 of write data 600 also does not begin a 1T bit and should not be emphasized, and assertion 642 of mask rising boost signal 620 signals this to the preamplifier.

By differentiating the emphasis information for rising and falling edges, the timing margin of each of the mask rising boost signal 620 and mask falling boost signal 622 can be greater than it would otherwise be if the rising and falling edges were not considered and signaled separately. In some embodiments, each pulse or assertion of the mask rising boost signal 620 and mask falling boost signal 622 is a 2T wide bit, bracketing the rising or falling edge of the write data that should not be emphasized. The mask rising boost signal 620 and mask falling boost signal 622 have a 1T setup time (e.g., 640) and a 1T hold time (e.g., 642).

In comparison, the boost waveforms 420, 520 of FIGS. 4 and 5 do not differentiate rising and falling edges of write data, and if the channel were to generate these waveforms for transmission to the preamplifier, each pulse would be a 1T wide bit with a much narrower timing margin than the mask rising boost signal 620 and mask falling boost signal 622 generated by the channel.

In some embodiments, the mask rising boost signal 620 and mask falling boost signal 622 are combined in the channel to yield a combined PAM-3 signal 650 to be transmitted to the preamplifier. The mask rising boost signal 620 and mask falling boost signal 622 are added to form the combined PAM-3 signal 650 in any suitable manner. For example, the combined PAM-3 signal 650 can be given level −1 values 652, 654, 656 in 2T wide bits bracketing the falling edges 624, 628, 630 in write data 600 that should not be emphasized, and level 1 values 660, 662 in 2T wide bits bracketing the rising edges 636, 640 in write data 600 that should not be emphasized, and otherwise a level 0 value that allows rising and falling edges beginning 1T wide write data bits to be emphasized.

Although the mask rising boost signal 620 and mask falling boost signal 622 in the example embodiment have 2T wide bits, some variation in this width can be made in some embodiments. However, by having a width of around 2T, overlap is prevented between assertions of the mask rising boost signal 620 and mask falling boost signal 622, simplifying their combination in PAM-3 signal 650.

In these embodiments, the write current edge emphasis controller in the preamplifier detects transitions in the write data, and the mask rising boost signal 620 and mask falling boost signal 622 or the decoded PAM-3 signal 650 are used to identify the edges that should not be emphasized in the preamplifier.

Figure 7:
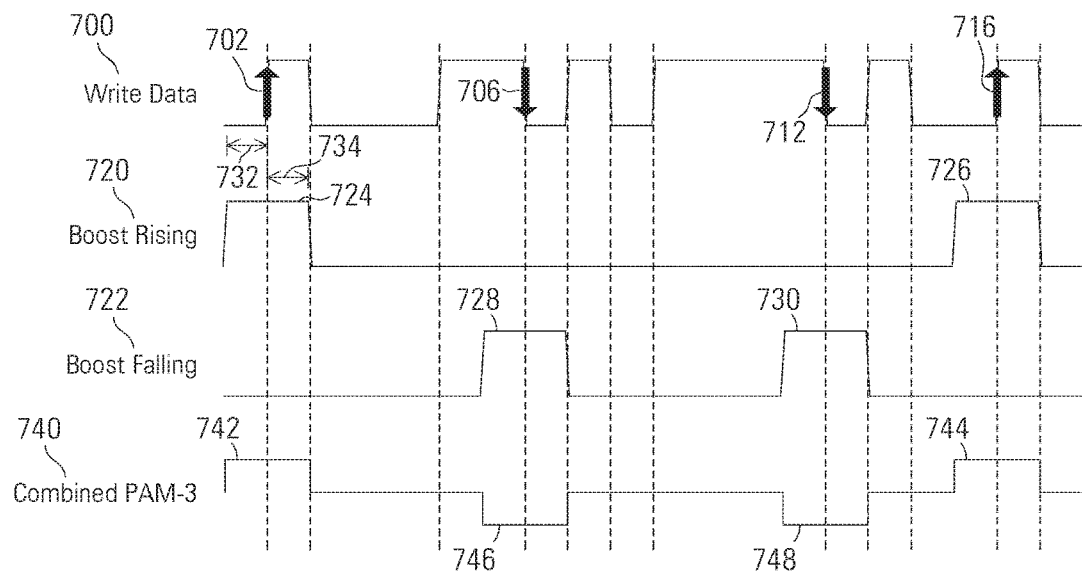
FIG. 7 depicts a timing diagram for the second operating mode illustrating differentiated individual boost rising and boost falling signals from a channel to a preamplifier in accordance with some embodiments of the present invention, and a corresponding combined PAM-3 boost rising and boost falling signal from a channel to a preamplifier in accordance with some other embodiments of the present invention.

Turning to FIG. 7, a timing diagram for the second operating mode depicts differentiated individual boost rising and boost falling signals generated in a channel circuit to be transmitted to a preamplifier in accordance with some embodiments of the present invention. In some other embodiments, the channel combines the individual boost rising and boost falling signals in a combined PAM-3 signal to be transmitted to the preamplifier. For the second operating mode, edges to be boosted are signaled by the channel rather than edges that should not be boosted, so that the differentiated signals do not overlap.

An example stream of write data 700 is depicted in which rising edges 702, 716 and falling edges 706, 712 begin 1T bits following >1T bits and are to be emphasized in the write current in this operating mode. In the embodiment of FIG. 7, the channel signals all transitions in the write data 700 that are to be emphasized with boost rising signal 720 and boost falling signal 722. For example, rising edges 702, 716 in write data 700 that should be emphasized in the write current are signaled on boost rising signal 720 with 2T wide bits 724, 726. Falling edges 706, 712 in write data 700 that should be emphasized in the write current are signaled on boost falling signal 722 with 2T wide bits 728, 730.

By differentiating the emphasis information for rising and falling edges, the timing margin of each of the boost rising signal 720 and boost falling signal 722 can be greater than it would otherwise be if the rising and falling edges were not considered and signaled separately. In some embodiments, each pulse or assertion of the boost rising signal 720 and boost falling signal 722 is a 2T wide bit, bracketing the rising or falling edge of the write data that should be emphasized. The boost rising signal 720 and boost falling signal 722 have a 1T setup time (e.g., 732) and a 1T hold time (e.g., 734).

In some embodiments, the boost rising signal 720 and boost falling signal 722 are combined in the channel to yield a combined PAM-3 signal 740 to be transmitted to the preamplifier. The boost rising signal 720 and boost falling signal 722 are added to form the combined PAM-3 signal 740 in any suitable manner. For example, the combined PAM-3 signal 740 can be given level 1 values 742, 744 in 2T wide bits bracketing the rising edges 702, 716 in write data 700 that should be emphasized, and level −1 values 746, 748 in 2T wide bits bracketing the falling edges 706, 712 that should be emphasized, and otherwise a level 0 value that prevents any edges from being emphasized.

Although the boost rising signal 720 and boost falling signal 722 in the example embodiment have 2T wide bits, some variation in this width can be made in some embodiments. However, by having a width of around 2T, overlap is prevented between assertions of the boost rising signal 720 and boost falling signal 722, simplifying their combination in PAM-3 signal 740.

Figure 8:
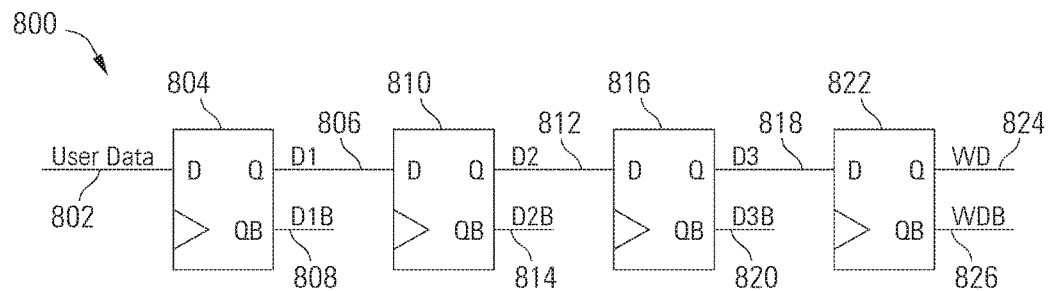
FIGS. 8-10 depict a block diagram of a circuit for generating mask rising boost and mask falling boost signals, with FIG. 8 depicting a pattern detection circuit, FIG. 9 depicting a block rising boost signal generator and FIG. 10 depicting a block falling boost signal generator in accordance with some other embodiments of the present invention.
Figure 9:
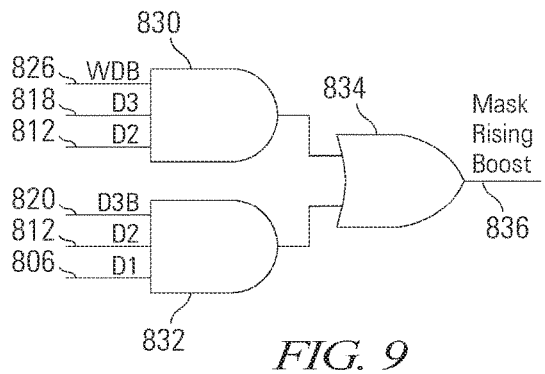
Figure 10:
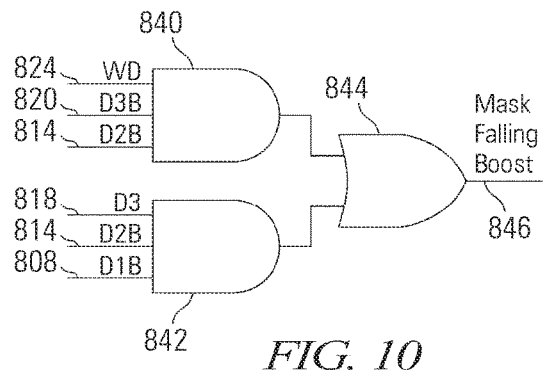

Turning to FIGS. 8-10, block diagrams of example circuits for generating mask rising boost and mask falling boost signals are depicted, with FIG. 8 depicting a pattern detection circuit, FIG. 9 depicting a block rising boost signal generator and FIG. 10 depicting a block falling boost signal generator in accordance with some other embodiments of the present invention. The bit sequences that cause mask falling boost 622 to be asserted for 2T and mask rising boost 620 to be asserted for 2T can be seen from the waveforms of FIG. 6. Again, in this operating mode, the first edge of any 1T write data bit is allowed to be emphasized by the preamplifier. When write data 600 has a value of 100 (see edges 602, 624 and 614, 628 and 616, 630) the mask falling boost 622 signal carries a 2T wide bit. However, a write data 600 sequence of 101 (see edges 606, 608, 610) would not assert the mask falling boost 622 signal, because each of the corresponding bits are 1T long and are thus allowed to be emphasized. The falling transition in a write data 600 sequence of 100 begins a bit of at least 2T width and is therefore blocked or masked from being emphasized in the preamplifier.

Similarly, when write data 600 has a value of 011 (see edges 636, 606 and 610, 640) the mask rising boost 620 signal carries a 2T wide bit. However, a write data 600 sequence of 010 (see edges 636, 606, 608) would not assert the mask rising boost 620 signal, because each of the corresponding bits are 1T long and are thus allowed to be emphasized. The rising transition in a write data 600 sequence of 011 begins a bit of at least 2T width and is therefore blocked or masked from being emphasized in the preamplifier.

The bit sequences used to generate the mask falling boost 622 and mask rising boost 620 signals can be detected using values at various points in the D flip-flop chain 800 of FIG. 8. User data 802 is received at a first flip flop 804, yielding Q output D1 806 and inverted QB output D1B 808. The Q output D1 806 is received as the input to a second flip flop 810, yielding Q output D2 812 and inverted QB output D2B 814. The Q output D2 812 is received as the input to a third flip flop 816, yielding Q output D3 818 and inverted QB output D3B 820. The Q output D3 818 is received as the input to a fourth flip flop 822, yielding Q output WD 824 and inverted QB output WDB 826.

An example circuit is depicted in FIG. 9 to generate 2T wide bits in mask rising boost signal 836 when write data has a 011 pattern. AND gate 832 asserts its output when inverted QB output D3B 820 from third flip flop 816 is asserted and Q output D2 812 from second flip flop 810 is asserted and Q output D1 806 from first flip flop 804 is asserted. AND gate 830 asserts its output one bit period later when inverted QB output WDB 826 from fourth flip flop 822 is asserted and Q output D3 818 from third flip flop 816 is asserted and Q output D2 812 from second flip flop 810 is asserted. As write data bits are shifted through flip flops 804, 810, 816, 822 one by one, earlier bits are stored by later flip flops in the chain. Thus, AND gate 830 detects the 011 pattern from one bit period later than AND gate 832 after another bit is received, shifting the 011 pattern further through the flip flop chain 800. The outputs of AND gates 830, 832 are combined in XOR gate 834, causing the mask rising boost signal 836 to be asserted for a 2T wide period, during a first 1T bit period when the 011 pattern is detected by AND gate 832 and then during a second 1T bit period when the 011 pattern is detected by AND gate 830.

An example circuit is depicted in FIG. 10 to generate 2T wide bits in mask falling boost signal 846 when write data has a 100 pattern. AND gate 842 asserts its output when Q output D3 818 from third flip flop 816 is asserted and inverted QB output D2B 814 from second flip flop 810 is asserted and inverted QB output D1B 808 from first flip flop 804 is asserted. AND gate 840 asserts its output one bit period later when Q output WD 824 from fourth flip flop 822 is asserted and inverted QB output D3B 820 from third flip flop 816 is asserted and inverted QB output D2B 814 from second flip flop 810 is asserted. As write data bits are shifted through flip flops 804, 810, 816, 822 one by one, earlier bits are stored by later flip flops in the chain. Thus, AND gate 840 detects the 100 pattern from one bit period later than AND gate 842 after another bit is received, shifting the 100 pattern further through the flip flop chain 800. The outputs of AND gates 840, 842 are combined in XOR gate 844, causing the mask falling boost signal 846 to be asserted for a 2T wide period, during a first 1T bit period when the 100 pattern is detected by AND gate 842 and then during a second 1T bit period when the 100 pattern is detected by AND gate 840. Similar circuits can be used to generate rising boost and falling boost signals in the second operating mode disclosed herein.

Individual mask rising boost and mask falling boost signals can be combined in the channel in a PAM-3 signal to be transmitted. In one example, the PAM-3 signal is at level 0 when mask rising boost and mask falling boost signals are both 0, and is at level +1 when mask rising boost is 1 and mask falling boost is 0, and is at level −1 when mask rising boost is 0 and mask falling boost is 1, although the system is not limited to this mapping to PAM-3 levels.

Figure 11:
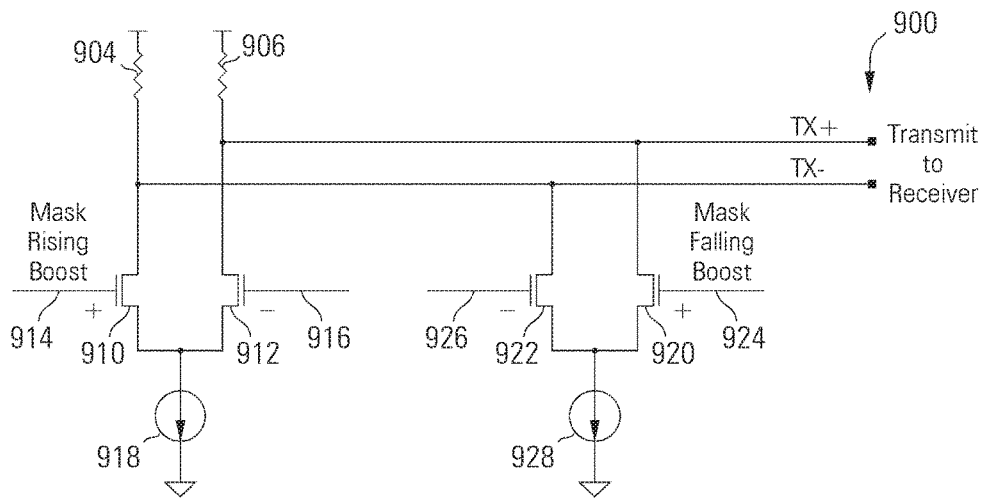
FIG. 11 depicts a block diagram of a circuit for combining mask rising boost and mask falling boost signals in a PAM-3 signal in accordance with some other embodiments of the present invention.

Turning to FIG. 11, a block diagram of a circuit for combining mask rising boost and mask falling boost signals in a PAM-3 signal is depicted in accordance with some other embodiments of the present invention. Such a combining circuit can be used in the channel to combine the individual mask rising boost and mask falling boost signals to yield a single PAM-3 signal 900 to be transmitted to the preamplifier. A pair of pullup resistors 904, 906 pull up the differential transmit lines when both mask rising boost and mask falling boost are 0, creating a 0V differential on the PAM-3 signal lines from the channel to the preamplifier. A pair of transistors 910, 912 are controlled by differential mask rising boost signals 914, 916 to connect a current source 918 to the differential transmit lines, and a second pair of transistors 920, 922 are controlled by differential mask falling boost signals 924, 926 to connect a second current source 928 to the differential transmit lines. When mask rising boost is 1 and mask falling boost is 0, the TX+ line minus the TX− line of the differential transmit lines yields a positive voltage differential for PAM-3 level −1. When mask rising boost is 0 and mask falling boost is 1, the TX+ line minus the TX− line of the differential transmit lines yields a negative voltage differential for PAM-3 level 1. When both mask rising boost and mask falling boost are 0, the TX+ line and the TX− line of the differential transmit lines have a 0V differential for PAM-3 level 0. Again, however, the mapping of emphasis information to PAM-3 levels is not limited to this example.

Figure 12:
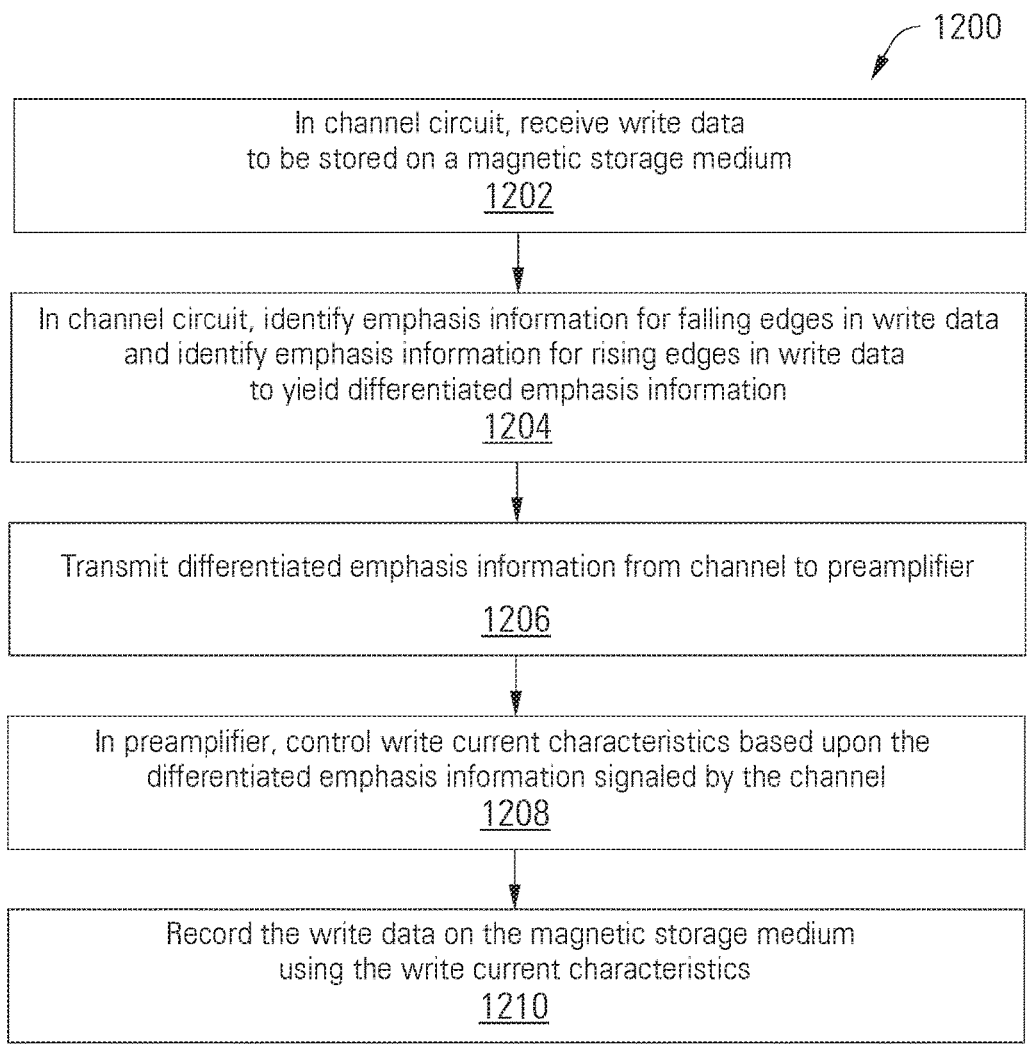
FIG. 12 depicts an operation for writing data in a magnetic recording system including differentiated write current emphasis signaling between a channel and a preamplifier in accordance with some embodiments of the invention.

Turning to FIG. 12, an operation for writing data in a magnetic recording system including differentiated write current emphasis signaling between a channel and a preamplifier is depicted in flow diagram 1200 in accordance with some embodiments of the invention. Following flow diagram 1200, write data to be stored on a magnetic storage medium is received by a channel circuit. (Block 1202) In the channel circuit, emphasis information is identified for falling edges in the write data and emphasis information is identified for rising edges in the write data to yield differentiated emphasis information. (Block 1204) In some embodiments, the emphasis information comprises a boost rising signal and a boost falling signal identifying which write data edges should be emphasized. In some other embodiments, the emphasis information comprises a mask rising boost signal and a mask falling boost signal identifying which write data edges should be not emphasized. The differentiated emphasis information is transmitted from channel to preamplifier. (Block 1206) The emphasis information can be transmitted in differential format or in any other suitable manner. In some embodiments, the differentiated emphasis information is transmitted from the channel as separate rising edge emphasis and falling edge emphasis signals. In some other embodiments, the rising edge emphasis signal and the falling edge emphasis signal are combined in a single PAM-3 or other multi-level signal which is transmitted from the channel to the preamplifier and decoded in the preamplifier. Write current characteristics are controlled in the preamplifier for write data edges identified in differentiated emphasis information from the channel. (Block 1208) Any write current characteristics can be controlled by the preamplifier based on the differentiated emphasis information, such as, but not limited to, current overshoot for selected write data edges. The write data is recorded on the magnetic storage medium using the write current characteristics. (Block 1210)

It should be noted that storage system 100 may be integrated into a larger storage system such as, for example, a RAID (redundant array of inexpensive disks or redundant array of independent disks) based storage system. It should also be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that some functions of the blocks, systems or circuits discussed herein may be implemented in either software or firmware. In some such cases, a part of a given system, block or circuit may be implemented in software or firmware, while other parts are implemented in hardware.

In conclusion, embodiments of the present invention provide novel systems, devices, methods and arrangements for differentiated write current emphasis signaling in a magnetic recording system. While detailed descriptions of one or more embodiments of the invention have been given above, various alternatives, modifications, and equivalents will be apparent to those skilled in the art without varying from the spirit of the invention. Therefore, the above description should not be taken as limiting the scope of embodiments of the invention which are encompassed by the appended claims.

What is claimed is:

1. A storage system, comprising:
   a magnetic storage medium;
   a magnetic write head;
   a channel circuit comprising a write data input, a differentiated edge emphasis signal generator, a write data output and a differentiated edge emphasis signal output; and
   a preamplifier comprising a write data input configured to receive write data from the channel circuit write data output, an edge emphasis signal input configured to receive a differentiated edge emphasis signal from the channel circuit differentiated edge emphasis signal output, and a write current edge emphasis controller configured to generate a write current to the magnetic write head based at least in part on the write data and on the differentiated edge emphasis signal, wherein the differentiated edge emphasis signal has a 1T setup time and a 1T hold time, wherein 1T comprises a fundamental bit period in the write data.

2. The storage system of claim 1, wherein the differentiated edge emphasis signal generator comprises a pattern detector configured to identify falling edges and rising edges in the write data that should be emphasized in the write current by the write current edge emphasis controller.

3. The storage system of claim 1, wherein the differentiated edge emphasis signal generator comprises a pattern detector configured to identify falling edges and rising edges in the write data that should not be emphasized in the write current by the write current edge emphasis controller.

4. The storage system of claim 1, wherein the differentiated edge emphasis signal generator is configured to identify rising edges preceding 1T write data bits to be emphasized and to identify falling edges preceding 1T write data bits to be emphasized, wherein 1T comprises a fundamental bit period in the write data.

5. The storage system of claim 1, wherein the differentiated edge emphasis signal generator is configured to identify rising edges that should not be emphasized and to identify falling edges that should not be emphasized, wherein the rising edges that should not be emphasized comprise rising edges other than rising edges preceding 1T write data bits, and wherein the falling edges that should not be emphasized comprise falling edges other than falling edges preceding 1T write data bits.

6. The storage system of claim 5, wherein the differentiated edge emphasis signal generator is configured to generate a three-level pulse amplitude modulated signal identifying the rising edges that should not be emphasized and the falling edges that should not be emphasized.

7. The storage system of claim 1, wherein the differentiated edge emphasis signal generator is configured to identify rising edges preceding 1T write data bits to be emphasized that follow longer write data bits and to identify falling edges preceding 1T write data bits to be emphasized that follow longer write data bits, wherein 1T comprises a fundamental bit period in the write data.

8. The storage system of claim 1, wherein the differentiated edge emphasis signal generator is configured to identify rising edges that should not be emphasized and to identify falling edges that should not be emphasized, wherein the rising edges that should not be emphasized comprise all rising edges other than rising edges preceding 1T write data bits following longer write data bits, and wherein the falling edges that should not be emphasized comprise all falling edges other than falling edges preceding 1T write data bits following longer write data bits.

9. The storage system of claim 8, wherein the differentiated edge emphasis signal generator is configured to generate a three-level pulse amplitude modulated signal identifying the rising edges that should be emphasized and the falling edges that should be emphasized.

10. A method of writing data to a magnetic storage device, the method comprising:
    receiving write data to be recorded on a magnetic storage device;
    in a channel circuit, identifying emphasis information for falling edges in the write data and identifying emphasis information for rising edges in the write data to yield differentiated emphasis information;
    transmitting the differentiated emphasis information from the channel circuit to a preamplifier;
    in the preamplifier, controlling a characteristic of a write current based upon the differentiated emphasis information; and
    recording the write data on the magnetic storage device according to the characteristic, wherein the differentiated emphasis information comprises a mask rising boost and mask falling boost signal configured to identify rising and falling edges in the write data that should not be emphasized in the write current by the preamplifier.

11. The method of claim 10, wherein the mask rising boost and mask falling boost signal identifies transitions of the write data at beginnings of runs of same-valued bits.

12. The method of claim 10, wherein the differentiated emphasis information comprises a three-level pulse amplitude modulated signal having a first level allowing write data edges to be emphasized in the write current by the preamplifier, a second level preventing rising edges in the write data from being emphasized in the write current by the preamplifier, and a third level preventing falling edges in the write data from being emphasized in the write current by the preamplifier.

13. The method of claim 10, wherein the differentiated emphasis information comprises a boost rising and boost falling signal configured to identify rising and falling edges in the write data that should be emphasized in the write current by the preamplifier.

14. The method of claim 13, wherein the boost rising and boost falling signal identifies first edges of any 1T bit of the write data following bits of longer than 1T, wherein 1T comprises a fundamental bit period of the write data.

15. The method of claim 10, wherein the differentiated emphasis information comprises a three-level pulse amplitude modulated signal having a first level preventing write data edges from being emphasized in the write current by the preamplifier, a second level causing rising edges in the write data to be emphasized in the write current by the preamplifier, and a third level causing falling edges in the write data to be emphasized in the write current by the preamplifier.

16. The method of claim 14, whereinthe differentiated emphasis information comprises 2T wide pulses.

17. The method of claim 10, wherein the differentiated emphasis information comprises a setup time of 1T and a hold time of 1T, wherein 1T comprises a fundamental bit period of the write data.

18. A data processing system comprising:
  means for detecting patterns in write data to be stored on a magnetic storage device and for determining whether falling edges in the write data should be emphasized in a write current and for determining whether rising edges in the write data should be emphasized in the write current to yield a differentiated emphasis signal;
  means for communicating the differentiated emphasis signal from a channel circuit to a preamplifier at a frequency lower than that of the write data wherein the differentiated emphasis signal is communicated to the preamplifier separately from the write data; and
  means for recording the write data on the magnetic storage device based at least in part on the differentiated emphasis signal communicated from the channel circuit to the preamplifier.

19. The data processing system of claim 18, wherein the differentiated emphasis signal comprises a mask rising boost and mask falling boost signal configured to identify rising and falling edges in the write data that should not be emphasized in the write current by the preamplifier.

20. The data processing system of claim 18, wherein the differentiated edge emphasis signal has a 1T setup time and a 1T hold time and wherein 1T comprises a fundamental bit period in the write data.

* * * * *